(12) United States Patent
Kozak

(10) Patent No.: US 7,400,972 B2
(45) Date of Patent: Jul. 15, 2008

(54) METHOD AND SYSTEM FOR ROUTE CALCULATION THAT AVOIDS RAILROAD CROSSINGS

(75) Inventor: Frank J. Kozak, Naperville, IL (US)

(73) Assignee: Navteq North America, LLC, Chicago, IL (US)

(*) Notice: Subject to any disclaimer, the term of this patent is extended or adjusted under 35 U.S.C. 154(b) by 992 days.

(21) Appl. No.: 10/867,545

(22) Filed: Jun. 14, 2004

(65) Prior Publication Data
US 2004/0243305 A1 Dec. 2, 2004

Related U.S. Application Data (62) Division of application No. 10/053,257, filed on Jan. 17, 2002, now Pat. No. 6,751,549.

(51) Int. Cl.
G21C 21/32 (2006.01)
G08G 1/123 (2006.01)

(52) U.S. Cl. .................. 701/209; 340/995.24

(58) Field of Classification Search ............... 701/200, 701/204, 208–209, 19, 20; 246/473.1; 340/995.24
See application file for complete search history.

(56) References Cited

U.S. PATENT DOCUMENTS

| | | | |
|---|---|---|---|
| 5,287,297 A | 2/1994 | Ihara et al. | |
| 5,874,905 A | 2/1999 | Nanba et al. | |
| 5,938,718 A | 8/1999 | Morimoto et al. | |
| 6,009,374 A | 12/1999 | Urahashi | |
| 6,035,253 A | 3/2000 | Hayashi et al. | |
| 6,243,646 B1* | 6/2001 | Ozaki et al. | 701/211 |
| 6,269,303 B1 | 7/2001 | Watanabe et al. | |
| 6,345,233 B1 | 2/2002 | Erick | |
| 6,688,561 B2* | 2/2004 | Mollet et al. | 246/473.1 |

* cited by examiner

*Primary Examiner*—Yonel Beaulieu
(74) *Attorney, Agent, or Firm*—Lisa M. Schoedel; Frank J. Kozak; Jon D. Shutter (57) ABSTRACT

A navigation system provides information about railroad crossing locations. A geographic database used by the navigation system includes data that indicate whether an at-grade railroad crossing is located along a road segment. Using this information, a route calculation function in the navigation system calculates a route to a destination that avoids road segments that have at-grade railroad crossings. In this way, the delays associated with waiting for a train to cross a road are avoided.

6 Claims, 7 Drawing Sheets

METHOD AND SYSTEM FOR ROUTE CALCULATION THAT AVOIDS RAILROAD CROSSINGS

REFERENCE TO RELATED APPLICATIONS

The present application is a divisional of Ser. No. 10/053,257, filed Jan. 17, 2002, now U.S. Pat. No. 6,751,549, the entire disclosure of which is incorporated herein by reference.

BACKGROUND OF THE INVENTION

The present invention relates to a feature provided by a navigation system whereby a route can be calculated that avoids at-grade railroad crossings.

Navigation systems are available that provide end users (such as drivers and passengers of the vehicles in which the navigation systems are installed) with various navigation-related functions and features. For example, some navigation systems are able to determine the fastest or shortest route to travel by roads between locations in a geographic region. Using input from the end user, and optionally from equipment that can determine one's physical location (such as a GPS system), a navigation system can examine various potential routes between two locations to determine the fastest or shortest route to travel from a starting location to a destination location in a geographic region. The navigation system may then provide the end user with information about the route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation systems provide many useful features, there continues to be room for new features and improvements. One area in which there is room for improvement relates to providing routes that satisfy various needs or requirements of end users. As noted above, navigation systems are able to determine the fastest route between two locations. However, this determination relies upon certain assumptions. For example, determining the fastest route necessarily does not take into account unforeseen delays, such as accidents or weather conditions, that have not yet occurred. Another type of occurrence that can cause a delay is a railroad train crossing. Waiting for a train to cross can add many minutes of delay to a route. This delay can be inconvenient or expensive.

Accordingly, it would be advantageous if a route calculation function in a navigation system could account for possible delays at railroad crossings when calculating a route to a destination.

SUMMARY OF THE INVENTION

To address these and other objectives, embodiments of the present invention comprises a feature for a navigation system that provides information about railroad crossing locations. According to one aspect of the disclosed subject matter, a geographic database used by a navigation system includes data that indicate whether an at-grade railroad crossing is located along a road segment. Using this information, a route calculation function in the navigation system calculates a route to a destination that avoids road segments that have at-grade railroad crossings. In this way, the delays associated with waiting for a train to cross a road are avoided.

According to another aspect of the disclosed subject matter, a geographic database includes information that indicates an estimated amount of railroad traffic or a schedule of railroad traffic at an at-grade railroad crossing along a road segment. Then, using this additional information, the route calculation function in the navigation system is able to calculate a route to a destination that minimizes delays associated with at-grade railroad crossings.

For purposes of this disclosure, a "navigation system" is understood to mean a navigation system installed in a vehicle (i.e., an in-vehicle navigation system). A "navigation system" is also understood to mean any software application installed on a computer platform that provides navigation-related features and uses geographic data, including applications that are installed on personal computers, networks, portable electronic devices, and so on.

DETAILED DESCRIPTION OF THE PRESENTLY PREFERRED EMBODIMENTS

I. Exemplary Navigation System Platform

A. Overview

Figure 1:
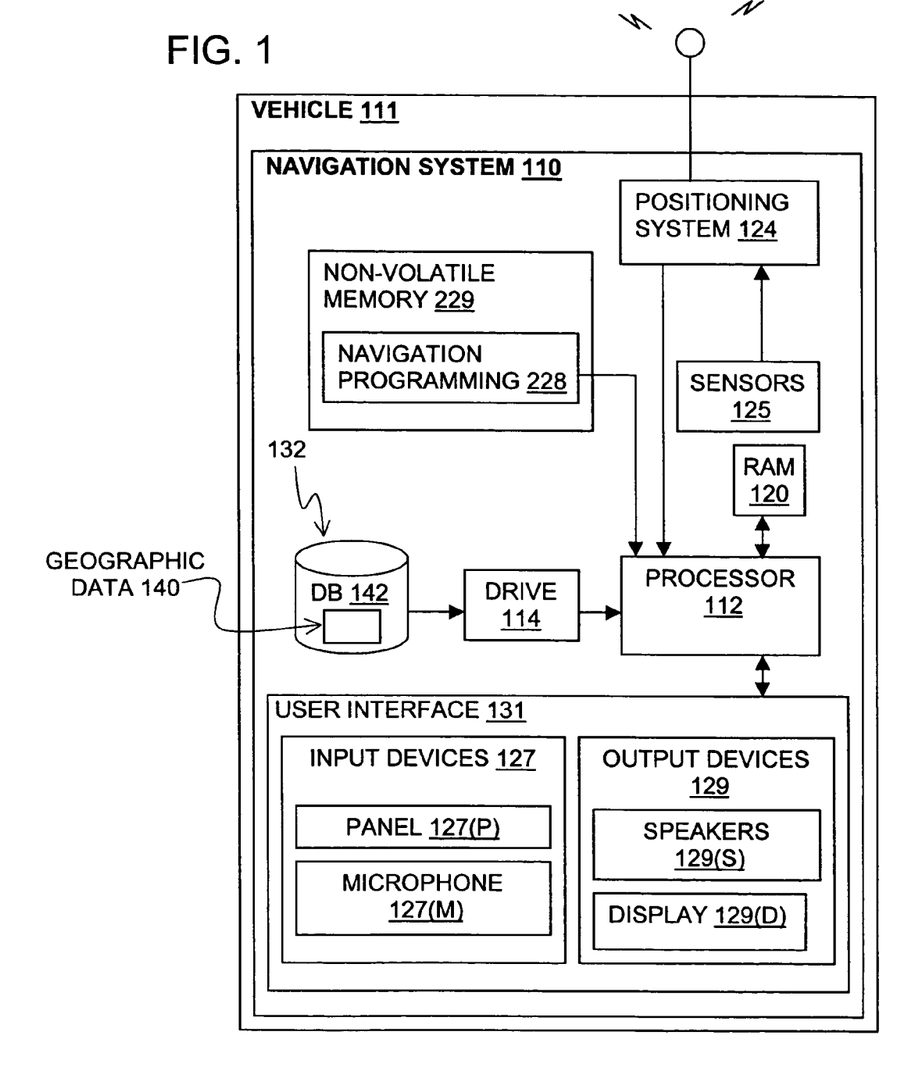
FIG. 1 is a block diagram illustrating a navigation system.

Referring to FIG. 1, there is a diagram illustrating an exemplary embodiment of a navigation system 110. The navigation system 110 may be stationary or portable. In the embodiment shown in FIG. 1, the navigation system 110 is a portable system located in a vehicle 111, such as an automobile, truck, or bus. In other embodiments, the navigation system 110 may be installed in other platforms.

The navigation system 110 is a combination of hardware and software components. The hardware components of the navigation system 110 may include a processor 112, memory 120, and so on. In the embodiment of FIG. 1, the navigation system 110 also includes a positioning system 124 that determines the position of the vehicle 111 in which it is installed.

The positioning system 124 may include sensors 125 or other components that sense the speed, orientation, direction, and so on, of the vehicle 111. The positioning system 124 may also include a GPS system.

The navigation system 110 also includes a user interface 131. The user interface 131 includes appropriate means 127 for receiving instructions and/or input from an end user of the navigation system. The instruction receiving means 127 may include a keyboard, keypad, or other type of input panel 127(P), a microphone 127(M), as well as other means for accepting end-user input, such as voice recognition software, and so on, through which the end user may request navigation information and services. The user interface 131 also includes appropriate means 129 for providing information back to the end user. The information providing means 129 may include a display 129(D) and speakers 129(S) (including speech synthesis hardware and software) through which the end user can be provided with information and services from the navigation system 110.

All of the components described above may be conventional (or other than conventional) and the manufacture and use of these components are known to those of skill in the art.

B. The Geographic Database

In order to provide navigation features to an end user, the navigation system 110 uses geographic data 140. The geographic data 140 includes information about one or more geographic regions or coverage areas. The geographic data 140 may be stored in the vehicle 111 or alternatively, the geographic data 140 may be stored remotely and made available to the navigation system 110 in the vehicle 111 through a wireless communication system which may be part of the navigation system 110. In another alternative, a portion of the geographic data 140 may be stored in the vehicle 111 and a portion of the geographic data 140 may be stored in a remote location and made available to the navigation system 110 in the vehicle 111 over a wireless communication system from the remote location.

In the embodiment shown in FIG. 1, some or all of the geographic data 140 are stored on a medium 132 which is located in the vehicle 111. Accordingly, the navigation system 110 includes a drive 114 (or other suitable peripheral device) into which the medium 132 can be installed and accessed. In one embodiment, the storage medium 132 is a CD-ROM disk. In another alternative embodiment, the storage medium 132 may be a PCMCIA card in which case the drive 114 would be substituted with a PCMCIA slot. Various other storage media may be used, including fixed or hard disks, DVD disks or other currently available storage media, as well as storage media that may be developed in the future.

The geographic data 140 may take a variety of different forms. In one embodiment, the geographic data 140 are in the form of one or more computer-readable data files or databases 142. The geographic database 142 includes data specifying the positions of the roads in the covered geographic region(s). The geographic database also includes data relating to the roads, such as restrictions on directions of travel along the roads (e.g., one-way streets), street addresses along the roads, street names, speed limits along the roads, turn restrictions at intersections, and so on. The geographic data 140 may also include information about points of interest in the geographic area, such as hotels, restaurants, museums, stadiums, offices, automobile dealerships, auto repair shops, etc. The geographic data 140 may also include information about places, such as cities, towns, or other communities. The geographic database 140 may include other kinds of data about the geographic area.

In one embodiment, the geographic database contains a plurality of road segment data entities. Each road segment data entity represents a portion (or segment) of a navigable road in the geographic region. In one type of geographic database, there is at least one database entry (also referred to as "entity" or "record") for each represented road segment in a geographic region. Each physical road segment has two nodes associated with it, one at each of the endpoints of the road segment. In this embodiment, the geographic data 140 also includes a plurality of data entities that represent these nodes. (The terms "segment" and "node" represent only one terminology for describing these physical geographic features and other terminology for these features is intended to be encompassed within the scope of these concepts.)

Data attributes are associated with each road segment data record to describe features or characteristics of the represented road segment. The various attributes associated with a road segment may be included in a single road segment record, or may be included in more than one type of record which are cross-referenced to each other.

Figure 2:
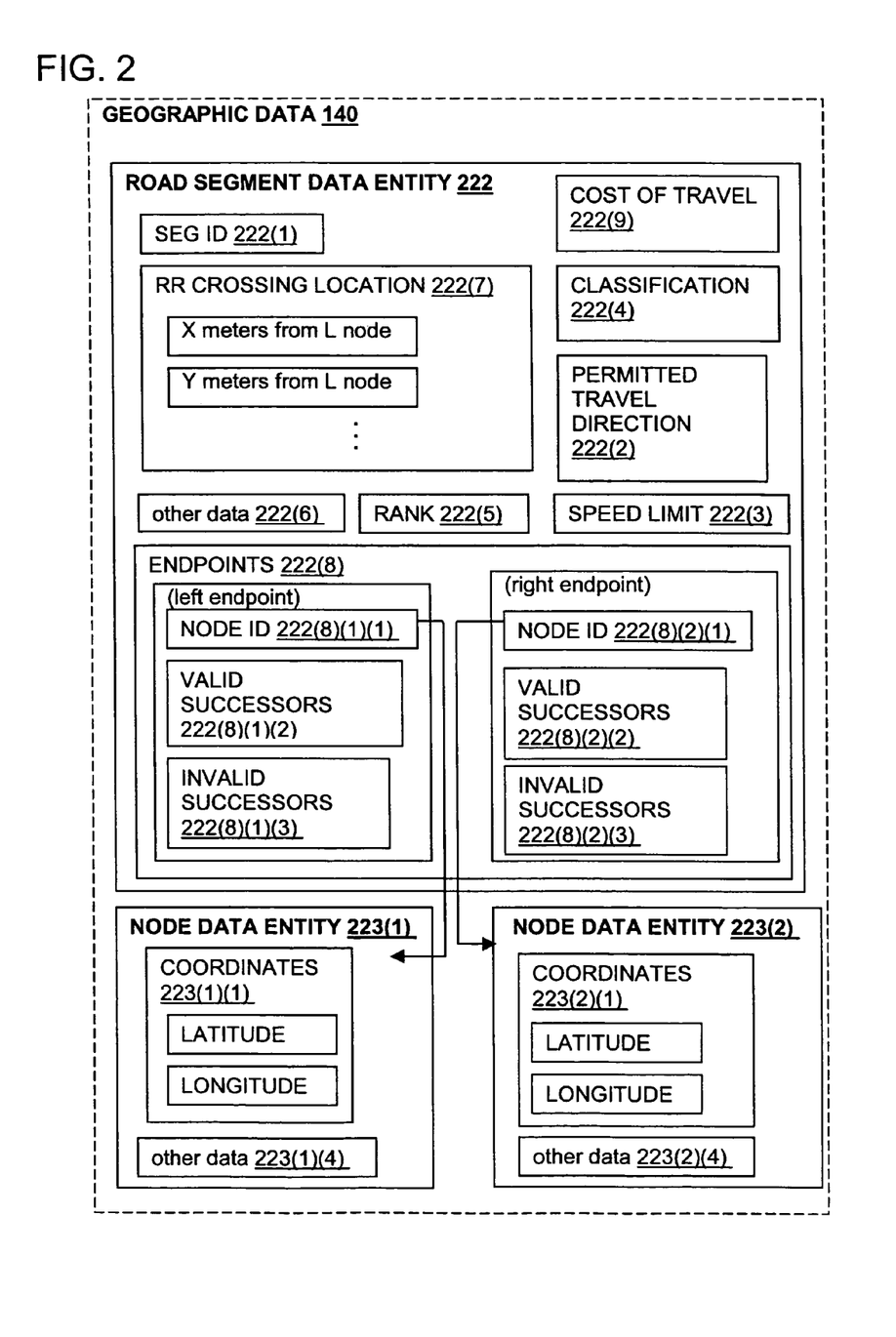
FIG. 2 is a block diagram illustrating components of a road segment data entity included in the geographic database of FIG. 1, wherein the road segment data entity includes railroad crossing location data.

FIG. 2 illustrates some of the components of a road segment data entity 222 included in the geographic data 140. The road segment entity 222 includes a segment ID 222(1) by which the record can be identified in the geographic database.

The road segment data entity 222 may also include data 222(3) that indicates the maximum permitted vehicular speed of travel on the represented road segment. The road segment data entity 222 may also include data 222(4) indicating whether the represented road segment is part of a controlled access road (such as an expressway), a ramp to a controlled access road, a bridge, a tunnel, a toll road, a ferry, and so on. The road segment data entity 222 may also include data 222(5) that indicates a rank of the represented road segment. (A rank of a road segment may correspond to its functional class. For example, road segments having a rank of "4" may include high volume, controlled access roads, such as expressways and freeways. Road segments having a rank of "3" maybe high volume roads with few speed changes, but are not necessarily controlled access roads. The lower ranked roads handle corresponding lower volumes and generally have more speed changes or slower speeds. Road segments having a rank of "0" can handle the lowest volumes. For example, these may include side streets, alleyways, etc.)

The road segment data entity 222 also includes data, 222(8)(1)(1) and 222(8)(2)(1), identifying the endpoints of the road segment. In one embodiment, these data, 222(8)(1)(1) and 222(8)(2)(1), include references to node data entities 223(1) and 223(2) defined for the nodes corresponding to the endpoints of the represented road segment. By convention, each road segment is considered to have a "left" node and a "right" node. The left node may be the node having greater longitudinal coordinates, or in the case in which the longitudinal coordinates are the same, the node having the lesser latitude. (Of course, which node is defined as the left or right node can be alternatively defined.) Each node data entity 223 includes data, 223(1)(1) or 223(2)(1), identifying the geographic coordinates (e.g., the latitude, longitude, and optionally altitude) of the represented endpoint.

Also associated with the road segment data entity 222 are data 222(8)(1)(2) and 222(8)(2)(2) indicating valid successor segments (if any) at each of the endpoints of the represented road segment. A valid successor segment is a road segment to which vehicular travel is legally permitted from the represented road segment. Also associated with the road segment data entity 222 are data 222(8)(1)(3) and 222(8)(2)(3) indicating invalid successor segments (if any) at each of the endpoints of the represented road segment. An invalid successor segment is a road segment to which vehicular travel is not legally permitted from the represented road segment.

The road segment data entity 222 may also include data 222(2) that indicate the direction(s) that vehicles are legally permitted to travel. For example, these data fields indicate whether traffic is permitted on the represented road segment in the direction from the left node to the right node of the segment and from the right node to the left node, respectively.

The embodiment of the road segment data entity 222 shown in FIG. 2 includes railroad crossing location data 222(7). The railroad crossing data 222(7) indicate whether an at-grade railroad crossing is located along the represented road segment. In this embodiment, the railroad crossing data 222(7) indicate the location along the represented road segment of each at-grade railroad crossing. The location of each at-grade railroad crossing may be indicated as a distance (e.g., in meters) from one end (i.e., either the right or left) of the represented road segment. Alternatively, the location of each at-grade railroad crossing may be indicated as a percentage or fraction (e.g., $n/256^{th}$) of the distance from one end of the represented road segment.

The road segment data entity 222 also includes data 222(9) that indicate the cost of travel along the road segment. The cost of travel 222(9) represents the approximate estimated amount of time it takes to traverse the road segment. The cost of travel may be expressed in seconds or minutes, or alternatively, the cost of travel may be proportional to the estimated amount of time. If travel in both directions is permitted on a road segment, there may be a separate value for the cost of travel for each direction.

The road segment record 222 may also include or be associated with other data 222(6) that include or refer to various other attributes of the represented road segment, such as the street address range along the represented road segment, the name of the road of which the represented road segment is a part, the highway designation of the road of which the road segment is a part, and so on.

In one embodiment, the geographic data are provided by Navigation Technologies Corporation of Chicago, Ill. However, it is understood that the inventive concepts disclosed herein are not restricted to any particular source of data.

C. The Navigation Programming.

Referring again to FIG. 1, in addition to the hardware components and geographic database, the navigation system 110 includes or uses navigation programming 228. The navigation programming 228 includes the software that provides for the functions and/or features performed by the navigation system 110. The navigation programming 228 uses the geographic data 140 in conjunction with input from the end user via the user interface 131, and possibly in conjunction with outputs from the positioning system 124, to provide various navigation-related features and/or functions.

The navigation programming 228 may be stored in a non-volatile storage medium 229 in the navigation system 110. Alternatively, the navigation programming 228 and the geographic data 140 may be stored together on a single storage device or medium. Alternatively, the navigation programming 228 may be located at a remote location and may be provided to or accessed by the navigation system 110 over a communications system.

In one embodiment, the navigation programming 228 is written in the C programming language although in alternative embodiments other programming languages may be used, such as C++, Java, Visual Basic, and so on.

Figure 3:
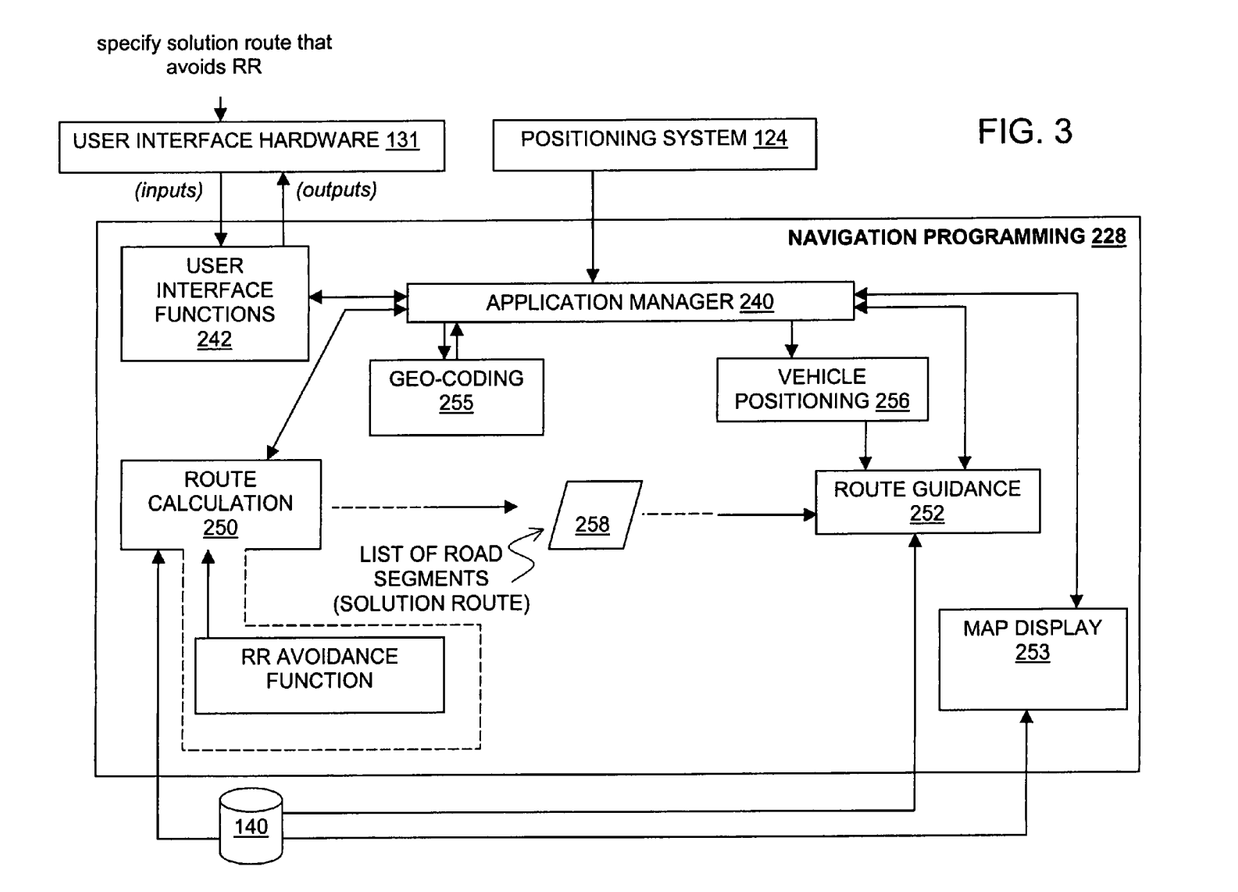
FIG. 3 is a block diagram illustrating components of the navigation programming shown in FIG. 1.

The navigation programming 228 may be formed of separate component applications (also referred to as programs, subprograms, routines, or tools). The component applications of the navigation programming 228 work together through defined programming interfaces. FIG. 3 shows a block diagram illustrating some of the component applications for one embodiment of the navigation programming 228 included in the navigation system 110 of FIG. 1. In addition to the component programs shown in FIG. 3, the navigation programming 228 may include other component sub-routines or programs.

In FIG. 3, the navigation programming 228 is shown to include a navigation application manager 240. The navigation application manager 240 is a program or routine that provides for overall management of the functions of the navigation system 110. The navigation application manager 240 may also include support for and interfaces to the navigation system hardware, such as the positioning system 124 and the user interface 131. The navigation application manager 240 includes user interface functions 242 to interface with the user interface hardware 131. These user interface functions 242 may provide for presenting a menu to the end user on the screen display 129(D) of the user interface hardware 131, accepting inputs from the end user via the input devices 127 of the user interface hardware 131, displaying results to the end user on the screen display 129(D) of the user interface hardware 131, and so on.

The navigation programming 228 includes sub-programs or routines that interface with the navigation application manager 240 and that provide for specific navigation-related features or functions to be performed by the navigation system. These sub-programs include a route calculation application 250, a route guidance application 252, a map display application 253, a geo-coding application 255 and a vehicle positioning application 256. The navigation programming 228 may include navigation applications in addition to these.

Example of Operation of Route Calculation and Guidance in the Navigation System

Route calculation and guidance are among the functions provided by the navigation system 110. Operation of the navigation system 110 to perform route calculation and guidance is described in this example.

Referring to FIG. 3, in one embodiment, a request for route guidance may originate with the end user. The end user indicates a desired destination using components of the user interface system 131, such as a keypad or microphone. The end user may also indicate a starting location or the current vehicle position may be taken as the starting location.

Referring to the embodiment shown in FIG. 3, the manager application 240 in the navigation system 110 receives the input from the user interface system 131 to calculate a route. The manager application 240 may modify the input or perform other functions. The manager application 240 forwards a request to the route calculation application 250 to calculate a route between the origin and the destination. The request may include additional information, such as desired intermediate stops, driver preferences (e.g., avoid toll roads, etc.), a start time, etc.

In one embodiment, the origin and destination are specified to the route calculation application 250 relative to data in the geographic database. For example, the origin and destination may be specified at or along a road segment represented by an identified road segment data record. The manager application 240 may obtain an identification of the road segment data record that represents the road segment upon which the vehicle is currently located from the vehicle positioning application 256. The manager application 240 may obtain an identification of the road segment data record that represents the road segment upon which the desired destination is located from the geo-coding application 255. (If the end user also specifies a desired origin, the manager application 240 may obtain an identification of the road segment data record that represents the road segment upon which the desired origin is located from the geo-coding application 255.) Thus, according to this embodiment, when the manager application 240 requests the route calculation application 250 to calculate a route between a specified origin and destination, it first obtains data from the geo-coding application 255 and possibly the vehicle positioning application 256 that relates the origin and destination to data in the geographic database 142. In an alternative embodiment, the functions of relating the end user specified destination and origin or the vehicle position may be performed by other routines including routines in the route calculation application 250.

As mentioned above, the route calculation application 250 may receive additional data that affects the calculation of the route. For example, the route calculation application 250 may receive data that specifies end-user preferences, such as avoidance of toll roads or expressways, and so on. The route calculation application 250 may also receive data that identifies the time of day at which the route will be started which may affect the calculation of a route. The route calculation function 250 may also receive data indicating intermediate stops that the end user would like to make.

Given data that identify the positions of an origin and destination, the route calculation application 250 calculates a route between the origin and the destination. The route calculation application 250 may use any of various means or algorithms for this purpose. For example, the method used may include either the A* algorithm or the Dykstra algorithm. Methods for calculating routes are disclosed in U.S. Pat. No. 6,192,314, the entire disclosure of which is incorporated by reference herein. (The methods disclosed in the aforementioned patent application represent only some of the ways that routes can be calculated and the subject matter claimed herein is not limited to any particular method of route calculation. Any suitable route calculation method now known or developed in the future may be employed.) When determining a route to a desired destination, the route calculation application 250 obtains and uses data about road segments from the geographic database 142.

Regardless of the method used, the objective of the route calculation application 250 is to develop a list identifying a continuous series of road segments that form a legally valid solution route between the origin and destination. (A "legally valid solution route" conforms to known traffic restrictions, such as one way streets, turn restrictions, etc.) The method used by the route calculation application 250 may be designed to optimize the solution route to meet one or more predetermined criteria. Such criteria may include the least travel time, the shortest distance, the fewest turns, etc. If the method used by the route calculation application 250 is designed to find a solution route that is optimized for one or more criteria, then the solution route also ideally meets these one or more criteria.

When using any of the aforementioned methods for calculating a solution route, the route calculation application 250 may explore several different alternative potential paths leading from the origin for inclusion in the solution route. The route calculation application 250 may also explore several different alternative potential paths leading back from the destination for inclusion in the solution route. Also, the route calculation application 250 may explore several different alternative potential paths leading from all or some of the intersections along potential portions of a solution route. For example, additional alternative paths may be identified and explored whenever an intersection having more than one valid successor road segment is encountered along an existing alternative potential solution path being explored. The number of different alternative potential solution paths can increase rapidly. According to some route calculation methods, as route calculation proceeds, some alternative potential solution paths being explored may be discarded based upon comparisons to other more promising alternative potential solution paths. According to some route calculation methods, as route calculation proceeds, further exploration of some alternative paths being explored may be suspended or deferred in favor of other, more promising, alternative potential solution paths.

As the route calculation application 250 evaluates different alternative potential solution paths for inclusion in the solution route, it stores data identifying the road segments included in each alternative potential solution path. The route calculation application 250 stores some or all of the data from the road segment data entities that represent road segments identified as being included in a potential solution path.

Referring to FIG. 3, after the route calculation application 250 has found a solution route, the route calculation application 250 provides an output 258. The output 258 contains an ordered list of entries. Each entry in the ordered list identifies a road segment that forms part of the solution route between the origin and the destination. In a present embodiment, the output 258 created by the route calculation application 250 is used as an input to the route guidance application 252. The route guidance application 252 includes functions that provide detailed maneuvering instructions and explication as the vehicle is being driven along the route calculated by the route calculation application 250. These functions in the route guidance application 252 use the data from the entries in the list included in the output 258 from the route calculation application 250, as well as additional information obtained from the geographic database system 142, to develop the detailed maneuvering instructions. Methods for developing these detailed maneuvering instructions are disclosed in U.S. Pat. Nos. 6,199,013 and 6,212,474, the entire disclosures of which are incorporated by reference herein.

The detailed maneuver instructions developed by the functions of the route guidance application 252 are provided as a data output of the route guidance application 252. This data output of the route guidance function 252 is returned to the manager application 240. The data output of the route guidance function 252 may be passed directly to the user interface system 131 for presentation to the end user. Alternatively, the data output returned by the route guidance application 252 to the manager application 240 may be further processed by programming in the manager application 240. The presentation of route guidance information to the end user via the user interface 131 may be in the form of audible instructions, visual textual instructions, visual graphical instructions, or any combinations of these or other types of information presentation.

The maneuvering instructions may be provided to the end user all at once, or alternatively, the maneuvering instructions may be provided one at a time as the vehicle is traveling. In one embodiment, each maneuvering instruction is provided separately (or in small groups of combined maneuvering instructions) in advance of when the specific maneuver is required to be taken so that the end user can prepare to make the required maneuver.

In order to provide maneuvering instructions at appropriate times and/or locations, the navigation system 110 uses data from the positioning system 124. The positioning system 124 determines the position of the vehicle as it is traveling. The vehicle positioning application 256 in the navigation programming 228 compares the vehicle position determined by the positioning system 124 to the positions of the road segments in the solution driving route 254. Using this comparison, the maneuver instructions, which are related to positions along the solution route, can be provided at appropriates times as these positions are approached.

The route guidance application 252 may also provide the end user with information about the remaining distance to the destination location. The navigation application manager 240 and the route guidance application 252 may also use the outputs from the positioning system 124 and the vehicle positioning application 256 for this purpose.

The list 258 of road segments from the route calculation application 250 may also be provided to the map display application 253. The map display application 253 uses the information in the list 254, as well as additional information from the geographic database 142, to provide graphical maps on the display (129(D) in FIG. 1) of the user interface 131. The graphical maps illustrate the areas through which the calculated route passes. The path of the calculated route may be highlighted on the displayed maps. The map display application 253 interfaces with the navigation application manager 240 so that the display maps are provided as the vehicle is traveling the calculated route. The navigation application manager 240 and the map display application 253 may receive the outputs from the positioning system 124 and the vehicle positioning application 256 for this purpose.

II. RR Crossing Avoidance Feature

As mentioned above, navigation systems can be very useful, providing end users with helpful navigation-related information. End users may enjoy even greater advantages with one or more of the embodiments disclosed herein.

As stated above, the route calculation application 250 can be configured to favor different kinds of routes. Different kinds of routes include routes that are optimized for one or more criteria or parameters. For example, a route can be optimized for least travel time or least distance.

According to an embodiment disclosed herein, the route calculation application in a navigation system determines a route that is optimized to avoid at-grade railroad crossings. When a route is optimized to avoid at-grade railroad crossings, road segments that have at-grade railroad crossings are suppressed or even avoided, to the extent possible, even if such road segments would otherwise provide the shortest route or the fastest route. (An at-grade railroad crossing is a location at which railroad tracks physically cross the road segment at the same level. At-grade railroad crossings do not include locations at which railroad tracks and a road segment cross at different levels, e.g., by means of a viaduct or an underpass or overpass.)

A route that avoids at-grade railroad crossings is not necessarily the fastest or the shortest route. However, an end user may wish to have a route that avoids at-grade railroad crossings when it is important to be at a destination by a certain time (e.g., for a business appointment). A route that is optimized for least travel time may get an end user to a destination more quickly on average. However, if the route optimized for least travel time includes at an at-grade railroad crossing and the user has to wait for a train at the crossing, the end user may experience a substantial delay. Thus, if it is important to be at a destination on time, it may be preferable to follow a route that takes slightly longer, but that avoids at-grade railroad crossings. In this way, the end user is less likely to arrive late at the destination.

It is noted that some at-grade railroad crossings may not be avoided entirely. If the only road to a destination includes an at-grade railroad crossing, then the road with the at-grade railroad crossing must be included in order to reach the destination. If a user has requested a route that avoids at-grade railroad crossings and an at-grade railroad crossing cannot be avoided, the navigation system informs the user via the user interface about this fact.

When a route is optimized for avoidance of at-grade railroad crossings, it may also be optimized for another parameter, such as least travel time or least distance. For example, when a route is optimized for both avoidance of at-grade railroad crossings and least travel time, the route calculation application attempts to find the fastest route but one that avoids at-grade railroad crossings. Similarly, when a route is optimized for both avoidance of at-grade railroad crossings and least distance, the route calculation application attempts to find the shortest route but one that avoids at-grade railroad crossings.

Figure 4:
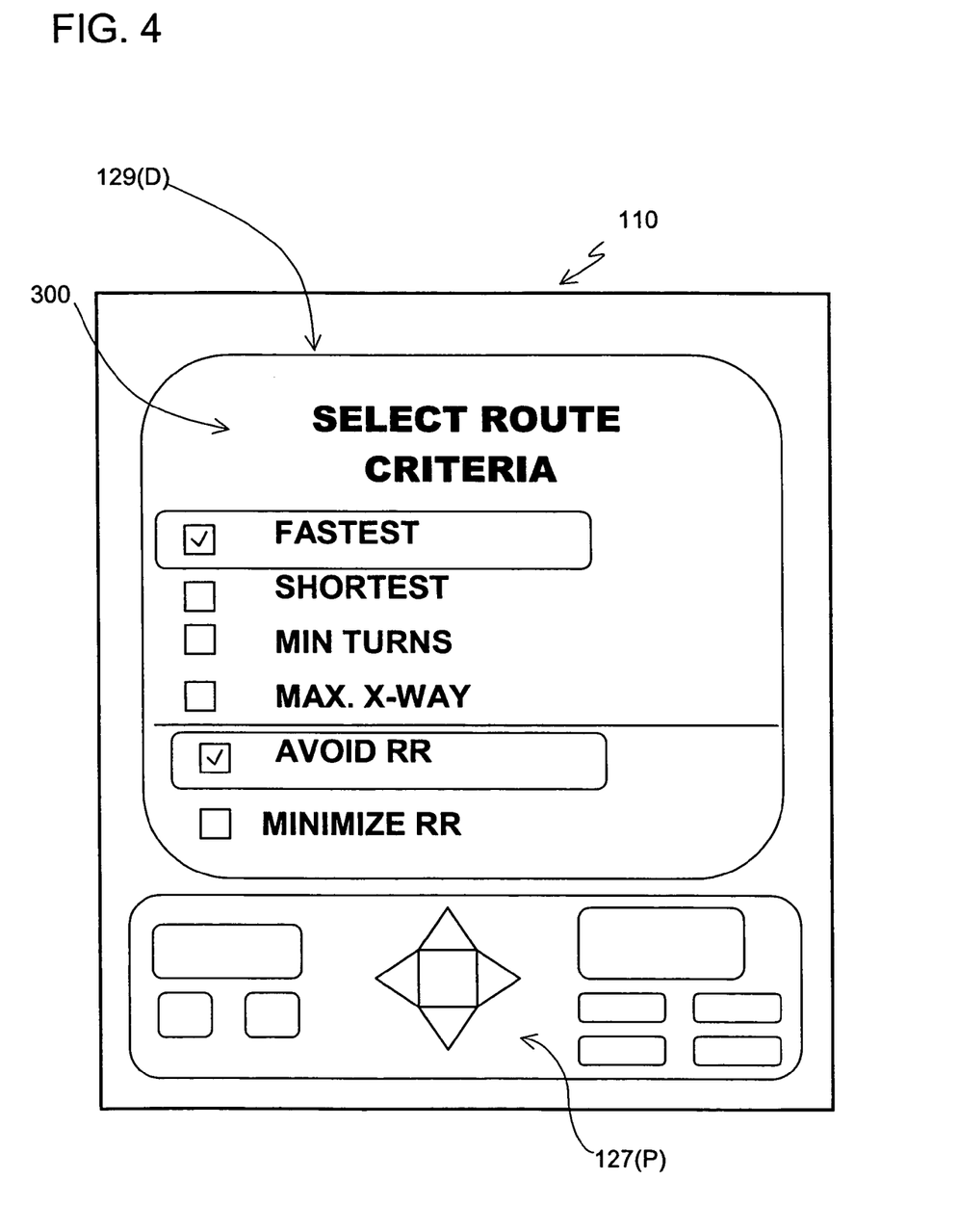
FIG. 4 is a front view of navigation system of FIG. 1.

The end user is provided with a means by which he/she can specify whether at-grade railroad crossings should be avoided. For example, the end user may be provided with a menu on the display screen of the user interface. The menu may specify various criteria or parameters for which route calculation can be optimized. Included among the different criteria or parameters for which a route can be optimized is avoidance of at-grade railroad crossings. FIG. 4 shows an example of the display screen 129(D) of the user interface 131 of the navigation system 110. On the display screen 129(D) is a menu 300 that can be used by the user to indicate that at-grade railroad crossings should be avoided when calculating a route to a destination.

Figure 5:
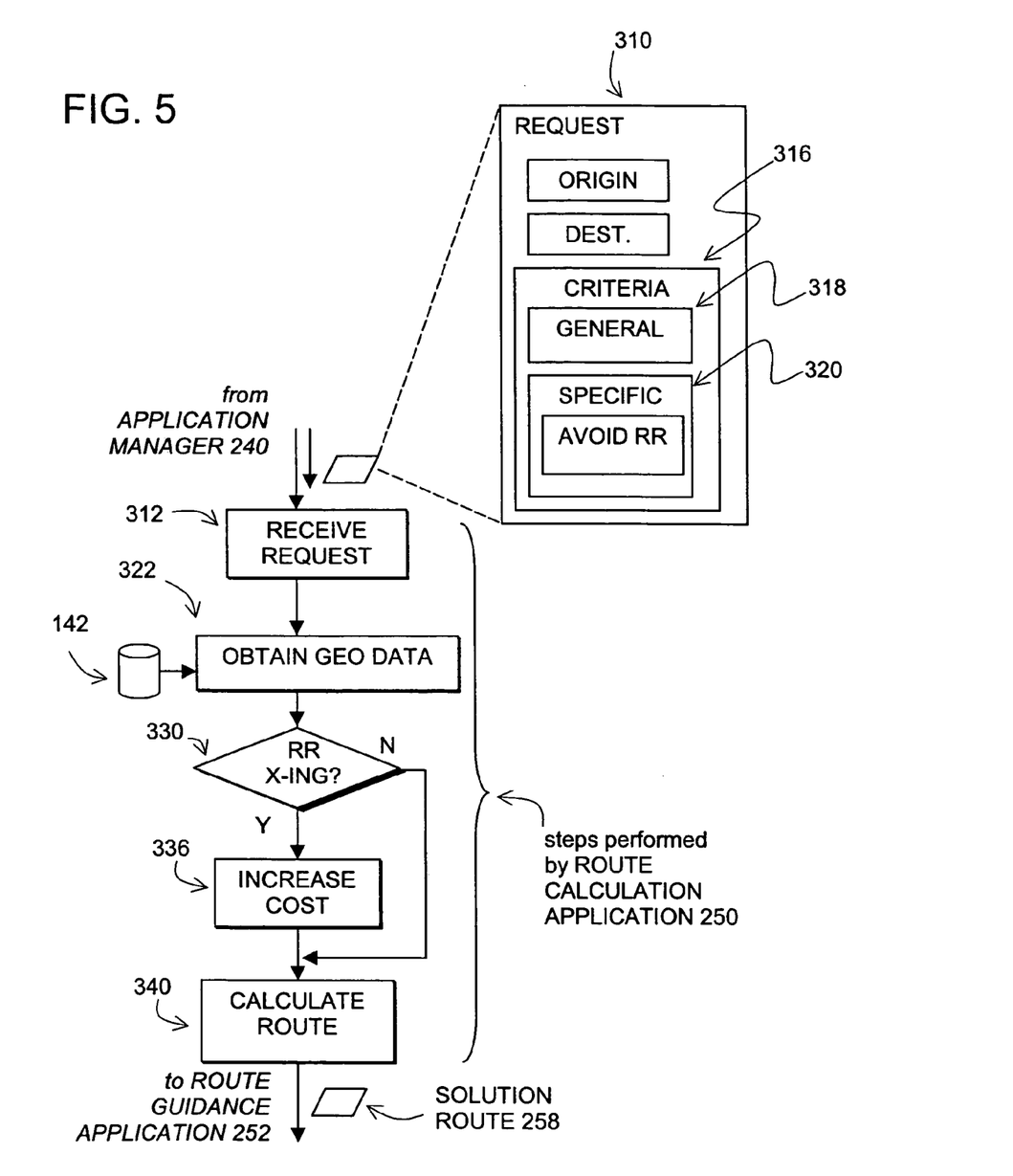
FIG. 5 is flowchart that illustrates the steps in a process performed by the navigation system of FIG. 1.

FIG. 5 is a flow chart that illustrates operation of one embodiment of the railroad crossing avoidance feature. The process in FIG. 5 operates at part of the route calculation application 250, described above.

In FIG. 5, the route calculation application 250 receives a request 310 to calculate a route to a destination (Step 312). The request 310 includes an identification of an origin and destination. The request 310 also includes criteria 316 to be used by the route calculation application 252 when calculating the route. The criteria 316 include a general criterion 318. The general criterion 318 may be 'least travel time', 'shortest distance', 'fewest turns', etc. The criteria 316 also include specific criteria 320. In this embodiment, the specific criteria 320 include an indication that at-grade railroad crossings should be avoided.

After receiving the request to calculate a route, the route calculation application 250 accesses the geographic database 142 to obtain data that represent road segments between the origin and destination (Step 322). As mentioned above, the data that represent road segments describe various attributes of the represented road segments, including whether there is an at-grade railroad crossing along the represented road segment (i.e., 222(7) in FIG. 2). As part of this process, the route calculation application 250 evaluates the data that represent road segments to determine whether any of them include the attribute indicating that an at-grade railroad crossing is located along the represented road segment (Step 330). If the data representing a road segment indicate that an at-grade railroad crossing is located along a represented road segment, the cost of travel of the represented road segment is increased by an amount (Step 336). This means that the time estimated to traverse the road segment is increased. The amount by which the cost of travel is increased is configurable. In one embodiment, the cost of travel is increased by the maximum amount of time associated with a railroad crossing delay. For example, if the railroad crossing delay is 15 minutes, then the cost of travel associated with a road segment that has an at-grade railroad crossing is increased by 15 minutes.

In FIG. 5, after the data representing road segments are modified to reflect the maximum potential delays associated with at-grade railroad crossings, the route calculation application calculates a route using the modified data (Step 340). The rest of the route calculation process proceeds as described above.

EXAMPLE

Figure 6:
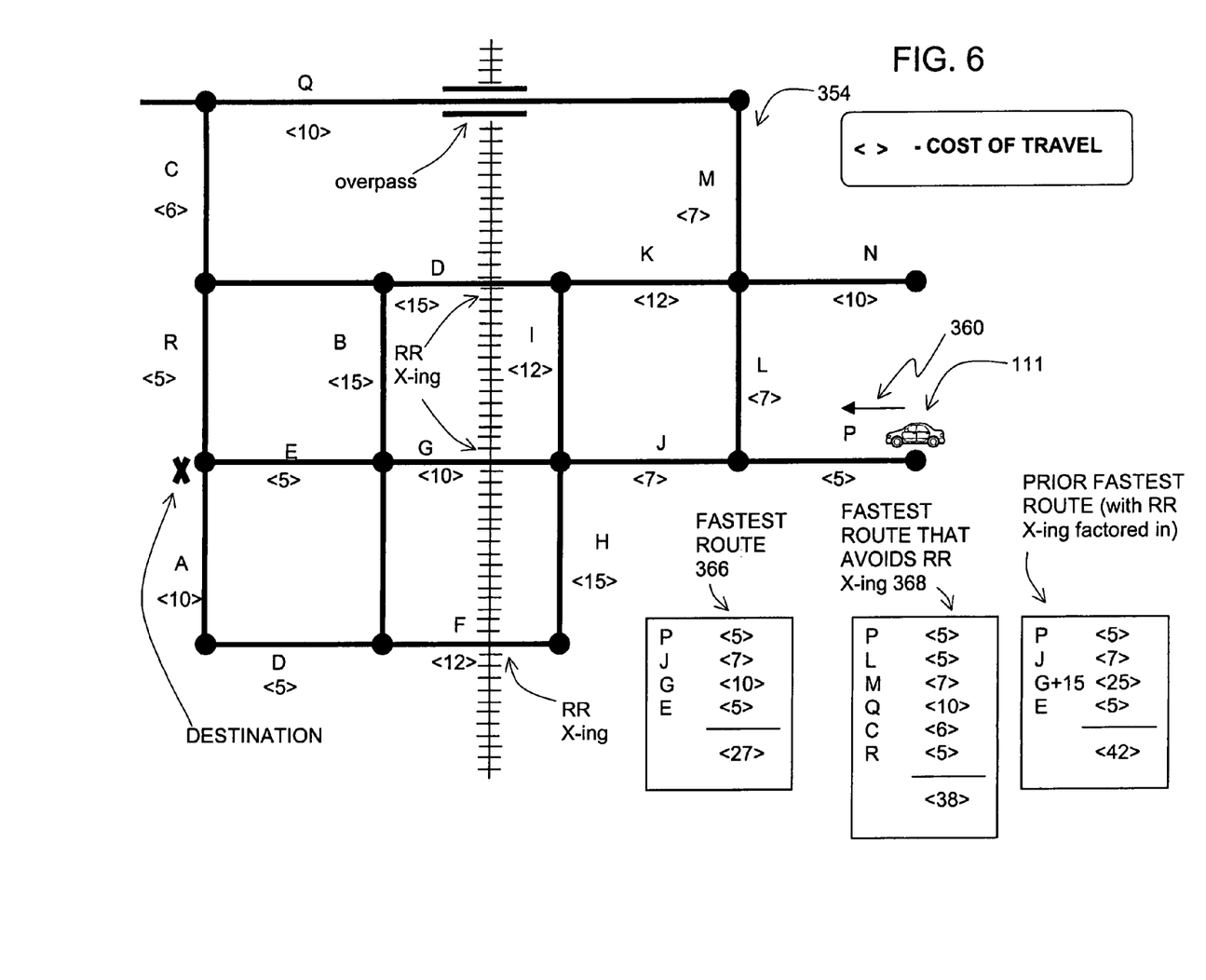
FIG. 6 is a map showing a portion of a road network and is used to illustrate an example of operation of the embodiment of FIG. 1.

FIG. 6 illustrates an example of how an embodiment of the railroad avoidance feature operates to determine a route to a destination that avoids at-grade railroad crossings.

FIG. 6 illustrates a portion of a road network 354. The road network 354 is comprised of road segments that connect intersections. The vehicle 111 having the navigation system 110 installed therein is located on a road segment labeled P traveling in a direction indicated by the arrow 360. The vehicle operator wants a route to a destination. The destination is located close to the intersection of the road segments labeled R and E.

In the geographic database used by the navigation system, each road segment is represented by data that indicates a cost of travel along the road segment. As mentioned above, the cost of travel represents the approximate estimated amount of time it takes to traverse the road segment. In FIG. 6, the value of the cost of travel for each road segment is shown next to the road segment.

In the example shown in FIG. 6, if the vehicle operator wants the fastest route to the destination, but does not specify that at-grade railroad crossings should be avoided, the navigation system in the vehicle provides a route that includes the road segments labeled P, J, G, and E. (FIG. 6 includes a listing, labeled 366, that includes the road segments in the fastest route.)

On the other hand, if the vehicle operator in FIG. 6 wants the fastest route to the destination that avoids at-grade railroad crossings, the navigation system provides a route that includes the road segments labeled P, L, M, Q, C and R. (FIG. 6 includes a listing, labeled 368, that includes the road segments in the fastest route that avoids at-grade railroad crossings.) In FIG. 6, when the route calculation application in the navigation system is requested to calculate a route that avoids at-grade railroad crossings, it evaluates the possible road segments to be included in the solution route and increases the cost of travel of any road segment that has an at-grade railroad crossing, as indicated by the data in the geographic database used by the navigation system. In the example of FIG. 6, the amount by which the cost of travel is increased for a railroad crossing is "15." Therefore, the route calculation application in the navigation system adds this amount to the cost of travel along the road segments labeled D, G, and F. This amount is not added to the road segment labeled Q because the road segment labeled Q includes an overpass over the railroad tracks. When the cost of travel along the road segments having at-grade railroad crossings is increased by '15', the overall cost of travel of the original fastest route is greater than the overall cost of travel of the route that includes the road segment Q with the overpass. Therefore, the navigation system in the vehicle 111 provide the vehicle operator with guidance for following the route along P, L, M, Q, C and R.

III. Alternative Embodiments

A. Cost of Travel Increase Alternatives

As mentioned above, when the route calculation application calculates a route that avoids at-grade railroad crossings, the cost of travel for a road segment that has an at-grade railroad crossing is increased by an amount. This amount may be fixed or configurable.

In one embodiment, the amount by which the cost of travel is increased corresponds approximately to the average duration of time that the road is blocked each time a train crosses. In another embodiment, the amount by which the cost of travel is increased corresponds approximately to the greatest duration of time that the road is blocked each time a train crosses. In still another alternative embodiment, the amount by which the cost of travel for a road segment with an at-grade railroad crossing is increased is a relatively much higher value (e.g., 100 or more) than the greatest duration of time that the road is blocked each time a train crosses. This latter embodiment accounts for the possibility that multiple trains may be crossing the road, one after the other. In one embodiment, the user is provided with the means to configure the amount of time by which the cost of travel for a road segment with an at-grade railroad crossing is increased. As an example, the user may be provided with selection alternatives on a menu screen of the user interface. The selection alternatives include "MINIMIZE RR X-INGS" and "AVOID RR X-INGS." If the user selects "AVOID RR X-INGS," the amount by which the cost of travel for a road segment with an at-grade railroad crossing is increased is a relatively much higher value than the greatest duration of time that the road is blocked each time a train crosses. If the user selects "MINIMIZE RR X-INGS," the amount by which the cost of travel for a road segment with an at-grade railroad crossing is increased corresponds either to the greatest duration of time that the road is blocked each time a train crosses or to the average duration of time that the road is blocked each time a train crosses.

B. Additional Railroad Crossing Data Alternatives

According to an alternative embodiment, the geographic database used by the navigation system includes additional information that pertains to at-grade railroad crossings.

In one alternative embodiment, the additional data about railroad crossings includes schedule information. This schedule information may include an actual schedule that includes specific times (i.e., time and duration) when a train crosses a road at an at-grade crossing. Each data record that represents a road segment that has an at-grade railroad crossing includes a pointer to the schedule that includes the times at which the represented road is blocked by a train crossing.

In another alternative embodiment, the additional data about railroad crossings includes estimated train traffic activity information. The estimated train traffic activity information indicates relative amounts of train traffic crossing activity, but does not necessarily indicate a specific time at which a train crossing is expected to block a road.

In one embodiment, the estimated train traffic information includes a value that indicates the relative amount of time that a road is blocked for train crossings. For example, a road that is blocked on average for three fifteen-minute crossings every four hours would have a value of 0.1875 (45/240).

According to another embodiment, the estimated train traffic information includes time-of-day and/or day-of-week information. Some at-grade railroad crossings have relatively more train crossing activity at certain times of day or on certain days of the week. As an example, at-grade railroad crossings for commuter trains may exhibit relatively more closures during rush hours than during midday, at night or on the weekends. Accordingly, the estimated train traffic information may include time-of-day and/or day-of-week data, which are related to the train traffic activity information.

In another alternative embodiment the estimated train traffic activity information includes crossing blockage duration data. The crossing blockage duration data indicate the estimated average duration of time that a road is blocked each time a train crosses and/or the estimated maximum duration of time that a road is blocked due to a train crossing. In some jurisdictions, the duration of time that a road can be blocked by a train crossing is limited by ordinance. The crossing blockage data can take these ordinances into account. The crossing blockage duration data may also be related to the time-of-day and/or day-of-week data and/or the train traffic activity information.

The estimated train traffic activity information may be collected by observation or alternatively, the estimated train traffic activity data may be obtained from railroad companies or from the state or local highway administrative agencies that maintain the crossings. Alternatively, the train traffic activity information may be estimated.

Figure 7:
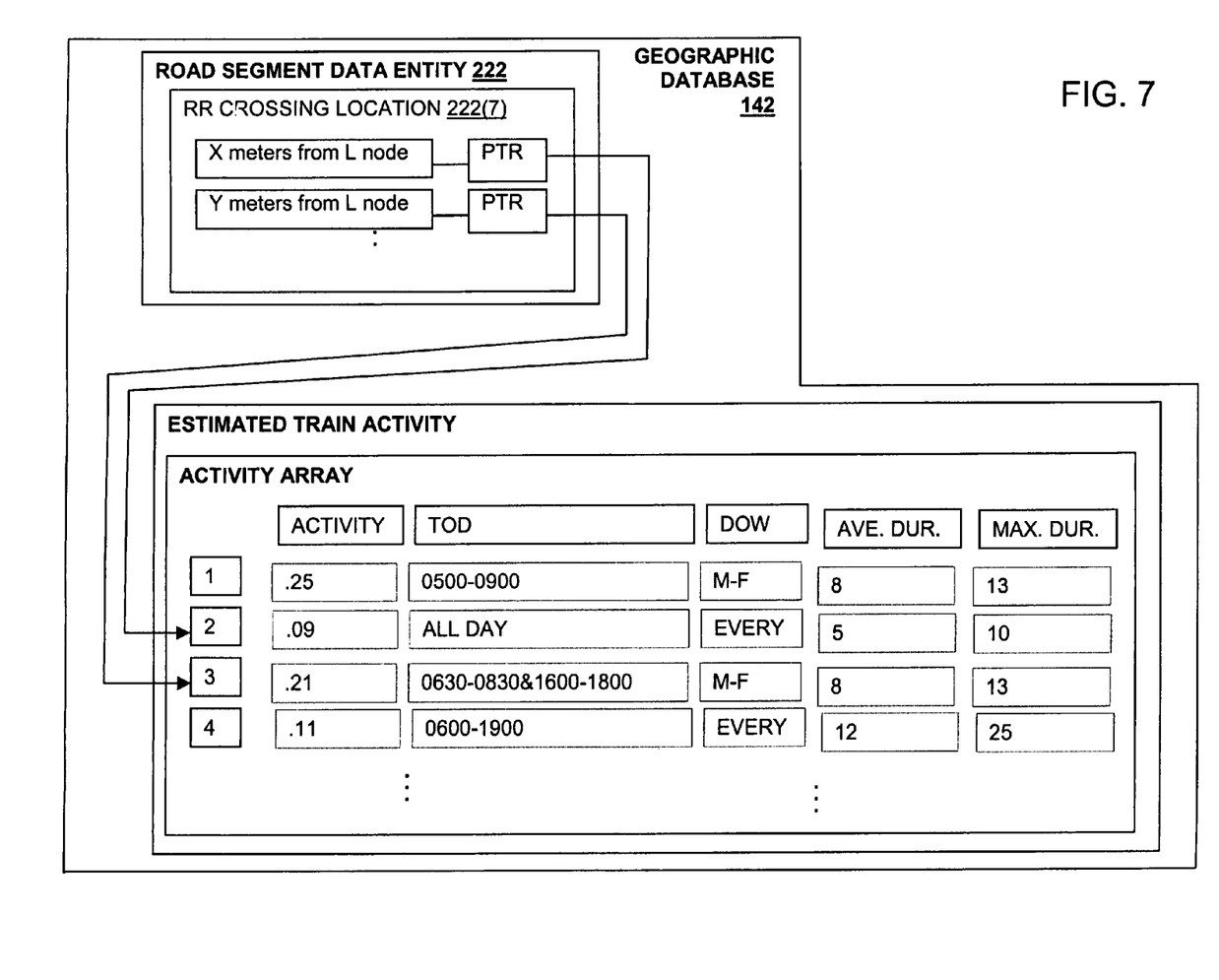
FIG. 7 is a block diagram showing components of a geographic database according to an alternative embodiment.

In one alternative embodiment, each road segment record that indicates that the represented road segment includes an at-grade railroad crossing includes a reference or pointer to an array table. The array table includes entries for different combinations of estimated train traffic activity information. For example, each entry in the table may include a combination of relative amounts of train traffic crossing activity data, time-of-day and/or day-of-week data, and crossing blockage duration data. The array table includes the most common combinations of estimated train traffic activity. FIG. 7 illustrates this embodiment.

When a navigation system uses a geographic database that includes either railroad crossing schedule information or estimated train traffic activity information, the route calculation application uses the additional information when implementing the railroad crossing avoidance feature. For example, if the estimated railroad activity information contained in the geographic database indicates that there are no train crossings at the time of day or day of week at which the vehicle is expected to cross the railroad tracks, then the road segment with the railroad tracks is not excluded from consideration for inclusion in a solution route to the destination.

C. Railroad Crossing Warnings.

In another embodiment, the navigation system uses the railroad crossing location data associated with the data that represent road segments to provide warnings to the vehicle operator that an at-grade railroad crossing exists along the route upon which the vehicle is traveling. There are several types of warnings that can be provided.

In one embodiment, the user requests the navigation system to calculate a route to a destination without specifying that at-grade railroad crossings should be avoided or minimized. Then, if the route calculated by the navigation system includes any at-grade railroad crossings, the navigation system provides a warning to the driver indicating that the route includes one or more at-grade railroad crossings. The navigation system provides this information to the user via the user interface, either audibly or visually. If an at-grade railroad crossing can be avoided, the navigation system may also request the user to indicate whether a route that avoids the at-grade railroad crossing would be preferred.

According to another embodiment, the navigation system may also indicate how much longer (in time and distance) a route that avoids at-grade railroad crossings would take. This provides the user with the opportunity to reconsider whether a route that avoids at-grade railroad crossings would be preferred In another embodiment, the navigation system can provide the vehicle driver with a warning when an at-grade railroad crossing is being approached. The navigation system can provide this warning when the user is following a calculated route to a destination. The navigation system can also provide a warning about at-grade railroad crossings when the user is not following a calculated route to a destination. When the user is not following a calculated route, the warning is provided when the vehicle enters a road segment that has a railroad crossing.

D. Other Alternatives

In one embodiment, the railroad crossing data contained in a data record that represents a road segment may indicate each railroad track that crosses the represented road segment. In another alternative, the railroad crossing data contained in a data record that represents a road segment may indicate a single railroad track crossing if more than one track are located within a given distance from each other along a represented road segment.

In another embodiment, the railroad crossing data contained in a data record that represents a road segment may indicate whether the railroad crossing is gated.

IV. Advantages

The disclosed embodiments provide advantages to users because they allow users to obtain routing information that more closely matches their requirements and needs. If an end user wants a higher level of confidence that he/she will arrive at a destination on time, he/she can choose to have the navigation system calculate a route that avoids at-grade railroad crossings. Such a route may take longer, but the risk of being delayed by a train crossing is reduced or eliminated.

Choosing routes that avoid railroad crossings can also be a factor for emergency vehicles, such as fire engines, ambulances, etc. Railroad crossing avoidance may also be preferable for some types of transportation, e.g., school buses, FedEx, trucking of hazardous materials, etc.

It is intended that the foregoing detailed description be regarded as illustrative rather than limiting and that it is understood that the following claims including all equivalents are intended to define the scope of the invention.

I claim:

1. A geographic database that represents road segments, the geographic database comprising:
    data entities that represent road segments;
    wherein each data entity that represents a road segment that has an at-grade railroad crossing located thereon includes data indicating the at-grade railroad crossing and the location thereof along the road segment.

2. The geographic database of claim 1 wherein each data entity that represents a road segment that has an at-grade railroad crossing located thereon is associated with data that indicates a relative amount of train traffic activity at the at-grade railroad crossing on the represented road segment.

3. The geographic database of claim 1 wherein each data entity that represents a road segment that has an at-grade railroad crossing located thereon is associated with data that indicates times of day associated with levels of train traffic.

4. The geographic database of claim 1 wherein each data entity that represents a road segment that has an at-grade railroad crossing located thereon is associated with data that indicates days of week associated with levels of train traffic.

5. The geographic database of claim 1 further comprising: train schedule information, wherein each data entity that represents a road segment that has an at-grade railroad crossing located thereon refers to the train schedule information for an indication of train traffic at the at-grade railroad crossing on the represented road segment.

6. The geographic database of claim 1 further comprising:

a table of train traffic activity combinations, wherein each data entity that represents a road segment that has an at-grade railroad crossing located thereon refers to the table of train traffic activity combinations for an indication of train traffic at the at-grade railroad crossing on the represented road segment.

\* \* \* \* \*